United States Patent
Foster et al.

(10) Patent No.: US 11,530,528 B2
(45) Date of Patent: Dec. 20, 2022

(54) SYSTEM AND METHOD FOR DETECTING TRIPPING OF GROUND ENGAGING TOOLS BASED ON IMPLEMENT FRAME MOTION

(71) Applicant: CNH Industrial America LLC, New Holland, PA (US)

(72) Inventors: Christopher A. Foster, Mohnton, PA (US); Joshua David Harmon, Leola, PA (US)

(73) Assignee: CNH INDUSTRIAL AMERICA LLC, New Holland, PA (US)

(*) Notice: Subject to any disclaimer, the term of this patent is extended or adjusted under 35 U.S.C. 154(b) by 501 days.

(21) Appl. No.: 16/666,815

(22) Filed: Oct. 29, 2019

(65) Prior Publication Data
US 2021/0123219 A1    Apr. 29, 2021

(51) Int. Cl.
*E02F 9/26* (2006.01)
*E02F 9/20* (2006.01)
*A01B 61/04* (2006.01)

(52) U.S. Cl.
CPC ............ *E02F 9/265* (2013.01); *E02F 9/2041* (2013.01); *E02F 9/268* (2013.01); *A01B 61/046* (2013.01)

(58) Field of Classification Search
CPC ......... E02F 9/265; E02F 9/2041; E02F 9/268; A01B 61/046; A01B 35/06; A01B 35/24; A01B 79/005; A01B 49/027
See application file for complete search history.

(56) References Cited

U.S. PATENT DOCUMENTS

| | | | |
|---|---|---|---|
| 4,353,423 A * | 10/1982 | Poggemiller | A01B 61/046 111/151 |
| 4,463,813 A | 8/1984 | Long et al. | |
| 4,548,277 A * | 10/1985 | Dietrich, Sr. | A01B 61/046 172/705 |
| 4,605,072 A | 8/1986 | Jones | |
| 5,641,026 A | 6/1997 | Balmer | |
| 5,787,992 A | 8/1998 | Dobson et al. | |
| 5,947,209 A | 9/1999 | Halford et al. | |
| 6,250,397 B1 | 6/2001 | Hook et al. | |
| 7,908,928 B2 | 3/2011 | Vik et al. | |
| 9,670,649 B2 | 6/2017 | Bewley et al. | |
| 10,011,975 B2 | 7/2018 | Carpenter et al. | |
| 2013/0234494 A1 | 9/2013 | Hall et al. | |
| 2014/0262372 A1 * | 9/2014 | Taunton | A01B 61/044 172/239 |

(Continued)

FOREIGN PATENT DOCUMENTS

WO    WO1998037749    9/1998

*Primary Examiner* — Russell Frejd
(74) *Attorney, Agent, or Firm* — Rebecca L. Henkel; Rickard K. DeMille

(57) ABSTRACT

In one aspect, a system for detecting tripping of ground engaging tools on an agricultural implement may include a ground engaging tool coupled to an implement frame. Furthermore, the system may include a motion sensor installed on the implement frame, with the motion sensor configured to capture data indicative of motion of the implement frame. Moreover, the system may include a controller configured to monitor the motion of the implement frame based on the data received from the motion sensor. In addition, the controller may be further configured to determine when the ground engaging tool has tripped based on the monitored motion.

19 Claims, 7 Drawing Sheets

(56) References Cited

U.S. PATENT DOCUMENTS

| | | |
|---|---|---|
| 2014/0262375 A1 | 9/2014 | Morris et al. |
| 2015/0284935 A1 | 10/2015 | Egger et al. |
| 2017/0196160 A1 | 7/2017 | Bjerketvedt et al. |
| 2018/0310465 A1 | 11/2018 | Peterson et al. |
| 2018/0310466 A1* | 11/2018 | Kovach .................. G01D 5/42 |
| 2019/0126912 A1* | 5/2019 | Peterson .............. B60W 10/30 |
| 2019/0235529 A1* | 8/2019 | Barrick ................. A01B 63/14 |
| 2019/0246548 A1* | 8/2019 | Kovach ................. A01B 63/32 |
| 2020/0158486 A1* | 5/2020 | Andrejuk ............. A01B 79/005 |
| 2020/0260633 A1* | 8/2020 | Kovach ............... A01B 49/027 |
| 2020/0260634 A1* | 8/2020 | Kovach ............... A01B 49/027 |

\* cited by examiner

SYSTEM AND METHOD FOR DETECTING TRIPPING OF GROUND ENGAGING TOOLS BASED ON IMPLEMENT FRAME MOTION

FIELD OF THE INVENTION

The present disclosure generally relates to agricultural implements and, more particularly, to systems and methods for detecting tripping of ground engaging tools of an agricultural implement based on the motion of the frame of the implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools, such as shanks, tines, and/or the like, which loosen and/or otherwise agitate the soil to prepare the soil for subsequent planting operations.

In general, the ground engaging tools of a tillage implement are configured to pivot out of the way of rocks or other impediments in the soil to prevent damage to the tools or other components of the implement. This is known as tripping. Specifically, the ground engaging tools are pivotably coupled to the frame of the tillage implement. Moreover, the tillage implement may also include biasing elements, such as springs, configured to exert biasing forces on the ground engaging tools. As such, the biasing forces acting on the ground engaging tools allow the ground engaging tools to maintain a particular penetration depth, while still allowing the tools to pivot out of the way of rocks/soil impediments. Frequent tripping of the ground engaging tools may result in an uneven seedbed.

Accordingly, an improved system and method of detecting tripping of ground engaging tools would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting tripping of ground engaging tools on an agricultural implement. The system may include an implement frame and a ground engaging tool coupled to the implement frame. Additionally, the system may include a biasing element coupled between the implement frame and the ground engaging tool, with the biasing element being configured to bias the ground engaging tool to a predetermined ground engaging tool position relative to the implement frame. Furthermore, the system may include a motion sensor installed on the implement frame, with the motion sensor configured to capture data indicative of motion of the implement frame. Moreover, the system may include a controller communicatively coupled to the motion sensor. As such, the controller may be configured to monitor the motion of the implement frame based on the data received from the motion sensor. In addition, the controller may be further configured to determine when the ground engaging tool has tripped based on the monitored motion.

In another aspect, the present subject matter is directed to an agricultural implement. The agricultural implement may include a frame and a plurality of ground engaging tools, with each ground engaging tool being independently coupled to the frame. Additionally, the agricultural implement may include a plurality of biasing elements, with each biasing element coupled between the frame and one of the plurality of ground engaging tools and each biasing element being configured to bias the corresponding ground engaging tool to a predetermined ground engaging tool position relative to the frame. Furthermore, the agricultural implement may include a motion sensor installed on the frame, with the motion sensor configured to capture data indicative of motion of the frame. Moreover, the agricultural implement may include a controller communicatively coupled to the motion sensor. As such, the controller configured to monitor the motion of the frame based on the data received from the motion sensor. In addition, the controller may be further configured to determine when a first ground engaging tool of the plurality of ground engaging tools has tripped or become damaged based on the monitored motion. Additionally, the controller may be further configured to determine which ground engaging tool of the plurality of ground engaging tools corresponds to the first ground engaging tool based on the monitored motion.

In a further aspect, the present subject matter is directed to a method for detecting tripping of ground engaging tools on an agricultural implement. The agricultural implement may include a frame and a ground engaging tool coupled to the frame. The method may include receiving, with one or more computing devices, data indicative of motion of the frame. Furthermore, the method may include determining, with the one or more computing devices, when the ground engaging tool has tripped based on the received data. Additionally, the method may include providing, with the one or more computing devices, a notification to an operator of the agricultural implement when it is determined that the ground engaging tool has tripped.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
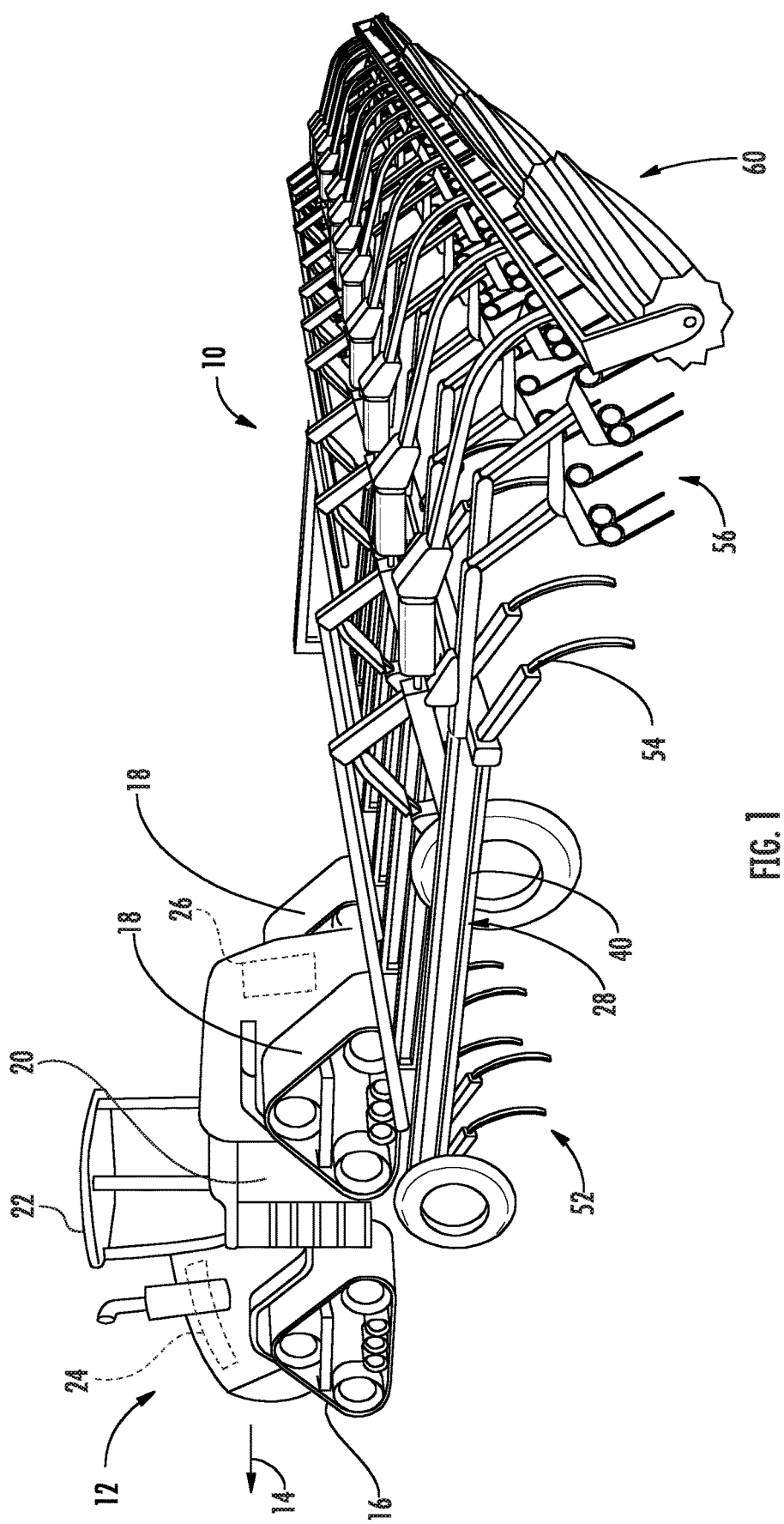
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting tripping of ground engaging tools of an agricultural implement. Specifically, in several embodiments, a controller of the disclosed system may be configured to monitor the motion (e.g., the acceleration) of a frame of the agricultural implement based on data received from one or more motion sensors (e.g., an inertial measurement unit(s)). The motion sensor(s) may, in turn, be installed or otherwise positioned on the implement frame. For example, in one embodiment, one motion sensor may be installed on each of a main frame section, a first wing section, and a second wing sections of the frame. Furthermore, the controller may be configured to determine when a ground engaging tool of the agricultural implement has tripped based on the monitored frame motion. When a ground engaging tool trips, the implement frame may generally experience a large motion or vibration. As such, in one embodiment, the controller may be configured to determine that the ground engaging tool has tripped when the monitored frame motion has exceeded a predetermined motion value. Thereafter, the controller may be configured to provide a notification to an operator of the agricultural implement indicating that a ground engaging tool has tripped and/or initiate an adjustment of the ground speed of the implement to reduce further tripping.

Figure 2:
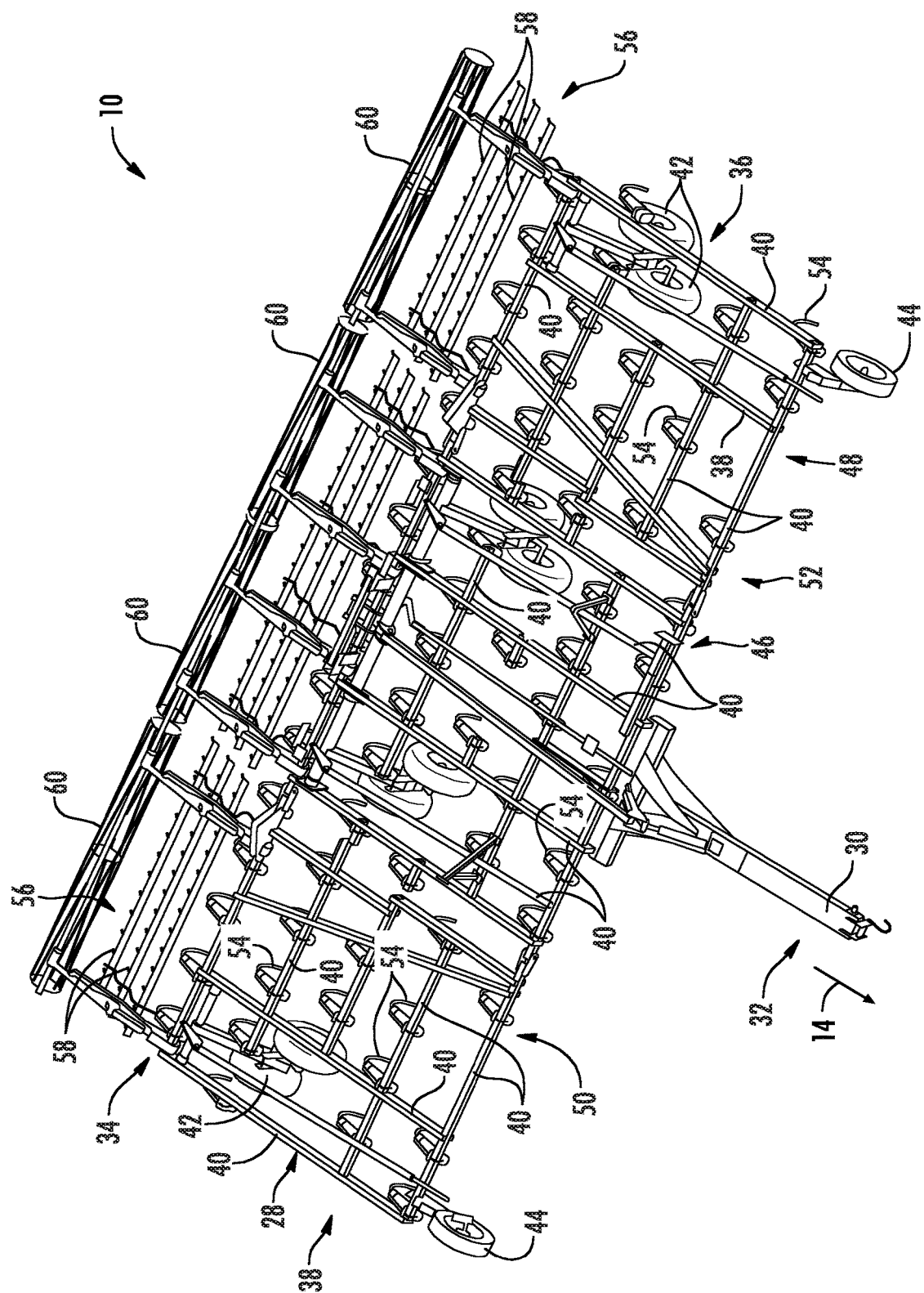
FIG. 2 illustrates an alternative perspective view of an agricultural implement shown in FIG. 1, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16 (one is shown), a pair or rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 12 and/or one or more components of the agricultural implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Moreover, as shown in FIGS. 1 and 2, the implement 10 may include the frame 28 configured to be towed by the vehicle 12 via a pull hitch or tow bar 30 in the direction of travel 14. As shown, the frame 28 may extend longitudinally between a forward end 32 and an aft end 34. The frame 28 may also extend laterally between a first side 36 and a second side 38. In this respect, the frame 28 generally includes a plurality of structural frame members 40, such as beams, bars, and/or the like, configured to support or couple to a plurality of components. Additionally, a plurality of wheels may be coupled to the frame 28, such as a set of centrally located wheels 42 and a set of front pivoting wheels 44, to facilitate towing the implement 10 in the direction of travel 14.

Furthermore, the frame 28 may include a plurality of sections. As shown in FIG. 2, for example, the frame 28 may include a main section 46 positioned centrally between the first and second sides 36, 38 of the frame 28. The frame 28 may also include a first wing section 48 positioned proximate to the first side 36 of the frame 28. Similarly, the frame 28 may also include a second wing section 50 positioned proximate to the second side 38 of the frame 28. The first and second wing sections 48, 50 may be pivotably coupled to the main section 46 of the frame 28. In this respect, the first and second wing sections 48, 50 may be configured to fold up relative to the main section 46 to reduce the lateral width of the implement 10 to permit, for example, storage or transportation of the implement on a road. However, in alternative embodiments, the frame 28 may include any suitable number of sections.

Additionally, in several embodiments, the frame 28 may be configured to support a cultivator 52, which may be configured to till or otherwise break the soil over which the implement 10 travels to create a seedbed. In this respect, the cultivator 52 may include a plurality of ground engaging shanks 54, which are pulled through the soil as the implement 10 moves across the field in the direction of travel 14. As will be described below, in some embodiments, the ground engaging shanks 54 may be pivotably mounted to the frame 28 to allow the shanks 54 pivot out of the way of rocks or other impediments in the soil. As shown, the ground engaging shanks 54 may be spaced apart from one another longitudinally between the forward end 32 and the aft end 34 of the frame 28 and/or between the first side 36 and the second side 38 of the frame 28.

As shown in FIGS. 1 and 2, the implement 10 may also include one or more harrows 56. In general, the harrow(s) 56 may be configured to be pivotably coupled to the frame 28. The harrow(s) 56 may include a plurality of ground engaging elements 58, such as tines or spikes, configured to level or otherwise flatten any windrows or ridges in the soil created by the cultivator 52. Specifically, the ground engaging elements 58 may be configured to be pulled through the soil as the implement 10 moves across the field in the direction of travel 14. However, in alternative embodiments, the implement 10 may include any other suitable number of harrows 56.

Moreover, in one embodiment, the implement 10 may include one or more baskets or rotary firming wheels 60. In general, the basket(s) 60 may be configured to reduce the number of clods in the soil and/or firm the soil over which the implement 10 travels. As shown, each basket 60 may be be pivotably coupled to one of the harrows 56. Alternately, the basket(s) 60 may be pivotably coupled to the frame 28 or any other suitable location of the implement 10. However, in alternative embodiments, the implement 10 may include any other suitable number of baskets 60.

Figure 3:
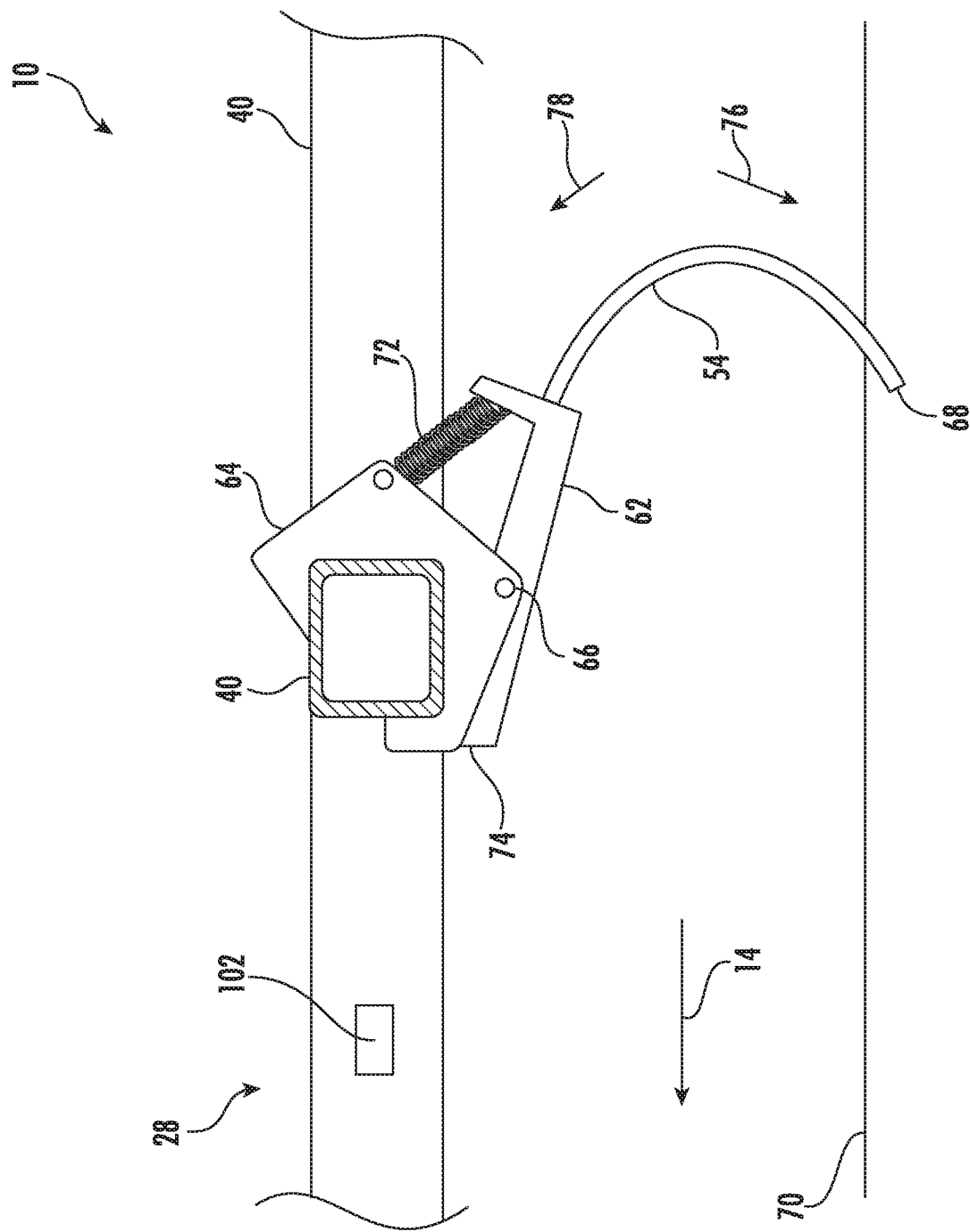
FIG. 3 illustrates a side view of one embodiment of a ground-engaging tool of an agricultural implement in accordance with aspects of the present subject matter, particularly illustrating a motion sensor installed on a frame of the implement.

Referring now to FIG. 3, a side view of one embodiment of a ground engaging shank 54 is illustrated in accordance with aspects of the present subject matter. As shown in FIG. 3, the shank 54 may be coupled to the frame 28 of the implement 10 by a shank holder 62. Specifically, in several embodiments, the shank holder 62 may be pivotably coupled to a shank mounting bracket 64 (e.g., at a pivot joint 66), which is, in turn, coupled to one of the frame members 40 of the implement frame 28. The shank 54 may be coupled to and extend from the shank holder 62 along a curved or arcuate profile to a tip 68. The tip 68 may, in turn, be configured to penetrate a soil surface 70 of the field such that the shank 54 engages the soil as the implement 10 is being pulled through the field. However, in alternative embodiments, the shank 54 may be configured in any other suitable manner. For example, in one embodiment, the shank 54 may be rigidly coupled or bolted to the frame 28.

In several embodiments, a biasing element 72 may be coupled between the implement frame 28 and the shank 54. In this respect, the biasing element 72 may be configured to bias the shank 54 to a predetermined shank position (e.g., a home or base position) relative to the frame 28. In general, the predetermined shank position may correspond to a shank position in which the shank 54 penetrates the soil to a desired depth. In one embodiment, the predetermined shank position may be set by a mechanical stop 74. In operation, the biasing element 72 may permit relative movement between the shank 54 and the implement frame 28. For example, the biasing element 72 may be configured to bias the shank 54 to pivot relative to the frame 28 in a first pivot direction (e.g., as indicated by arrow 76 in FIG. 3) until the shank holder 62 contacts the stop 74. The biasing element 72 may also allow the shank 54 to pivot away from the predetermined shank position (e.g., to a shallower depth of penetration), such as in a second pivot direction (e.g., as indicated by arrow 78 in FIG. 3) opposite the first pivot direction 76, when encountering rocks or other impediments in the field. As shown in FIG. 3, the biasing element 72 may be configured as a spring. However, in alternative embodiments, the biasing element 72 may be configured as any other suitable biasing element. For example, in one embodiment, the biasing element may be configured as a hydraulic cylinder, a pneumatic cylinder, an electric linear actuator, or another suitable actuator.

It should be appreciated that the configuration of the implement 10 described above and shown in FIGS. 1-3 is provided only to place the present subject matter in an exemplary field of use. Thus, it should be appreciated that the present subject matter may be readily adaptable to any manner of implement configuration.

In accordance with aspects of the present subject matter, one or more motion sensors 102 may be installed on or otherwise provided in operative association with the frame 28 of the implement 10. In general, the motion sensor(s) 110 may be configured to capture data indicative of the motion (e.g., the acceleration or vibrations) experienced by the frame 28 as the implement 10 is being moved across the field. As will be described below, the implement frame 28 may experience large accelerations or vibrations when one or more of the ground engaging tools (e.g., a shank(s) 54) mounted thereon have tripped. As such, a controller may be configured to receive data from the motion sensor(s) 102 and determine when a ground engaging tool(s) mounted on the frame 28 has tripped based on the received data. In one embodiment, the motion sensor(s) 102 may be configured as an inertial measurement unit(s). However, in alternative embodiments, the motion sensor(s) 102 may be configured as any other suitable sensor(s) or sensing device(s) configured to capture data indicative of the motion, accelerations, vibrations, inertia, angular momentum, rotation, and/or the like of the implement frame 28.

Figure 4:
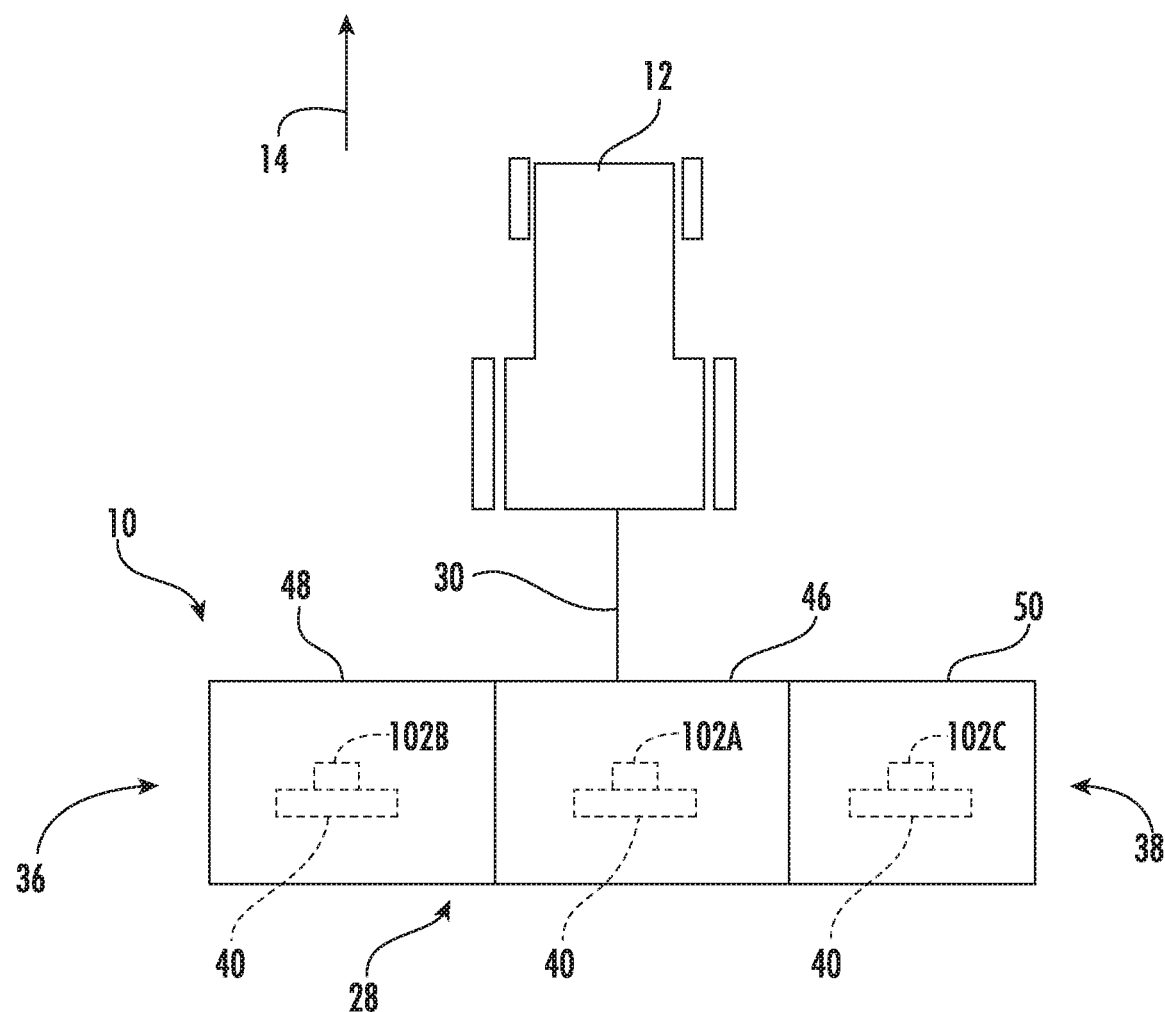
FIG. 4 illustrates a schematic, top down view of the work vehicle and the agricultural implement shown in FIGS. 1 and 2, particularly illustrating various locations for installing motion sensors on a frame of the implement.

It should be appreciated that the motion sensor(s) 102 may be installed on the implement frame 28 at any suitable location(s). Specifically, in several embodiments, the motion sensor(s) 102 may be installed on one or more of the frame members 40 of the frame 28. For example, FIG. 4 illustrates a schematic top-down view of the implement 10 and the work vehicle 12 shown in FIGS. 1-3, particularly illustrating various installation locations for a plurality of motion sensors 102. As shown, a first motion sensor 102A may be installed on a frame member 40 of the main section 46 of the frame 28 for detecting the motion of the main section 46. Moreover, a second motion sensor 102B may be installed on a frame member 40 of the first wing section 48 of the frame 28 for detecting the motion of the first wing section 48. Additionally, a third motion sensor 102C may be installed on a frame member 40 of the second wing section 50 of the frame 28 for detecting the motion of the second wing section 50. However, in alternative embodiments, the motion sensor(s) 102 may be installed at any other suitable location(s) on the implement frame 28. For example, a single motion sensor 102 may be mounted on the implement frame 28 or a plurality of motion sensors 102 may be mounted on each section of the frame 28. In addition, the motion sensor(s) 102 may be installed on any other suitable components of the frame 28, such as the shank mounting bracket(s) 64, in addition to or lieu of the frame members 40. Furthermore, although the embodiment of the frame 28 shown in FIG. 4 includes three motion sensor(s) 102, it should be appreciated that any other suitable number of motion sensors 102 may be installed on the frame 28.

Figure 5:
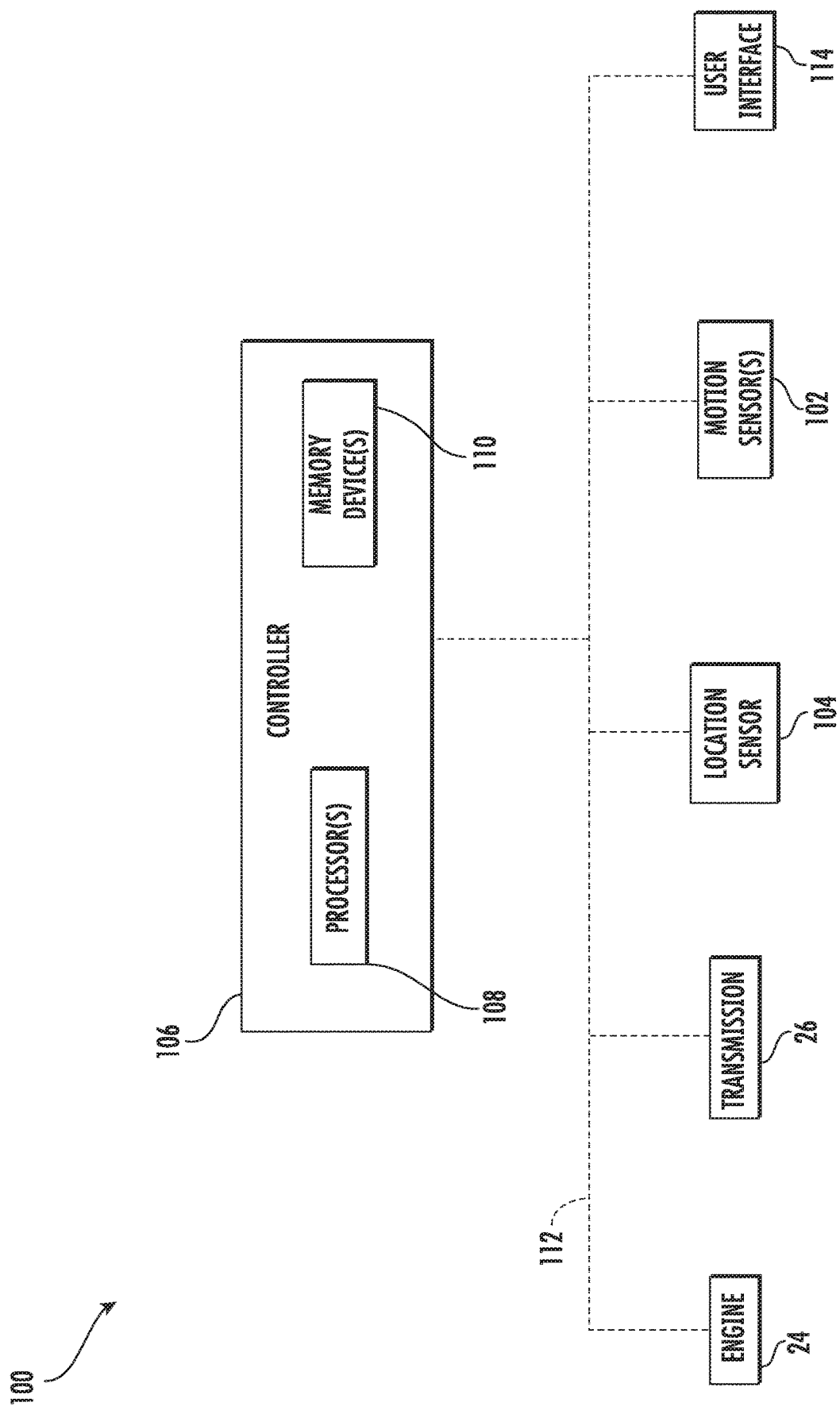
FIG. 5 illustrates a schematic view of one embodiment of a system for detecting tripping of ground engaging tools on an agricultural implement in accordance with aspects of the present subject matter.

Referring now to FIG. 5, a schematic view of one embodiment of a system 100 for detecting tripping of ground engaging tools on an agricultural implement is illustrated in accordance with aspects of the present subject matter. In general, the system 100 will be described herein with reference to the agricultural implement 10 described above with reference to FIGS. 1-4. However, it should be appreciated by those of ordinary skill in the art that the disclosed system 100 may generally be utilized with agricultural implements having any other suitable implement configuration.

As shown in FIG. 5, the system 100 may include a location sensor 104 may be provided in operative association with the implement 10 and/or the vehicle 12. In general, the location sensor 104 may be configured to determine the current location of the implement 10 and/or the vehicle 12 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 104 may be transmitted to a controller(s) of the implement 10 and/or the vehicle 12 (e.g., in the form coordinates) and stored within the controller's memory for subsequent processing and/or analysis. For instance, based on the known dimensional configuration and/or relative positioning between the implement 10 and the vehicle 12, the determined location from the location sensor 104 may be used to geo-locate the implement 10 within the field.

In accordance with aspects of the present subject matter, the system 100 may include a controller 106 positioned on and/or within or otherwise associated with the implement 10 or the vehicle 12. In general, the controller 106 may comprise any suitable processor-based device known in the art, such as a computing device or any suitable combination of computing devices. Thus, in several embodiments, the controller 106 may include one or more processor(s) 108 and associated memory device(s) 110 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 110 of the controller 106 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 110 may generally be configured to store suitable computer-readable instructions that, when implemented by the processor(s) 108, configure the controller 106 to perform various computer-implemented functions.

In addition, the controller 106 may also include various other suitable components, such as a communications circuit or module, a network interface, one or more input/output channels, a data/control bus and/or the like, to allow controller 106 to be communicatively coupled to any of the various other system components described herein (e.g., the engine 24, the transmission 26, the motion sensor(s) 102, and the location sensor 104). For instance, as shown in FIG. 5, a communicative link or interface 112 (e.g., a data bus) may be provided between the controller 106 and the components 24, 26, 102, 104 to allow the controller 106 to communicate with such components 24, 26, 102, 104 via any suitable communications protocol (e.g., CANBUS).

It should be appreciated that the controller 106 may correspond to an existing controller(s) of the implement 10 and/or the vehicle 12, itself, or the controller 106 may correspond to a separate processing device. For instance, in one embodiment, the controller 106 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 106 may be performed by a single processor-based device or may be distributed across any number of processor-based devices, in which instance such devices may be considered to form part of the controller 106. For instance, the functions of the controller 108 may be distributed across multiple application-specific controllers, such as a navigation controller, an engine controller, an implement controller, and/or the like.

Furthermore, in one embodiment, the system 100 may also include a user interface 114. More specifically, the user interface 114 may be configured to provide feedback (e.g., feedback associated with tripping of the ground engaging tools of the implement 10) to the operator of the implement/vehicle 10/12. As such, the user interface 114 may include one or more feedback devices (not shown), such as display screens, speakers, warning lights, and/or the like, which are configured to provide feedback from the controller 106 to the operator. The user interface 114 may, in turn, be communicatively coupled to the controller 106 via the communicative link 112 to permit the feedback to be transmitted from the controller 106 to the user interface 114. In addition, some embodiments of the user interface 114 may include one or more input devices (not shown), such as touchscreens, keypads, touchpads, knobs, buttons, sliders, switches, mice, microphones, and/or the like, which are configured to receive user inputs from the operator. In one embodiment, the user interface 114 may be mounted or otherwise positioned within the cab 22 of the vehicle 10. However, in alternative embodiments, the user interface 114 may mounted at any other suitable location.

In several embodiments, the controller 106 may be configured to monitor the motion (e.g., the acceleration/vibrations) of the frame 28 of the implement 10. As described above, one or more motion sensors 102 may be installed on the implement frame 28, with each sensor 102 configured to capture data indicative of the motion of the frame 28. In this regard, as the implement 10 travels across the field to perform an agricultural operation thereon (e.g., a tillage operation), the controller 106 may be configured to receive the data from the motion sensor(s) 102 (e.g., via the communicative link 112). Thereafter, the controller 106 may be configured to process/analyze the received sensor data to determine or estimate the current motion of the implement frame 28. For instance, the controller 106 may include a look-up table(s), suitable mathematical formula, and/or algorithms stored within its memory device(s) 110 that correlates the received sensor data to the motion of the frame 28. In some embodiment, the controller 106 may be configured to preprocess the received sensor (e.g., remove outliers) be determine the motion of the implement frame 28.

It should be appreciated that the controller 106 may be configured to monitor any suitable motion-based parameter(s) of the implement frame 28 based on the received sensor data. As will be described below, when one or more ground engaging tools (e.g., the shank(s) 54) trip, the implement frame 28 may experience vibrations or otherwise accelerate relative to the field. As such, in one embodiment, the controller 106 may be configured to monitor the magnitude or amplitude of the vibrations/accelerations of the implement frame 28. In another embodiment, the controller 106 may be configured to monitor the frequency of the vibrations/accelerations of the implement frame 28. However, in alternative embodiments, the controller 106 may be configured to monitor any other suitable motion-based parameter(s) of the implement frame 28, such as the inertia, angular momentum, rotation, and/or the like of the frame 28.

In accordance with aspects of the present subject matter, the controller 106 may be configured to determine when one or more ground engaging tools of the implement 10 have tripped. As indicated above, the ground engaging tools (e.g., a shank(s) 54) mounted on the implement frame 28 may trip or otherwise be displaced from their associated predetermined shank positions when such tools encounter rocks or other impediments within the field to prevent damage to the tools and/or the implement 10. When a ground engaging tool trips, the implement frame 28 may experience large vibrations or accelerations. As such, the motion of the implement frame 28 may be indicative of tripping of the ground engaging tools. In this regard, the controller 106 may be configured to determine when one or more of ground engaging tools mounted on the implement 10 have tripped based on the monitored motion of the implement frame 28. For example, in one embodiment, the controller 106 may be configured to compare the values associated with the monitored motion of the frame 28 to a predetermined motion value. Thereafter, when the value(s) of the monitored frame motion exceeds the predetermined motion value, the controller 106 may be configured to determine that one or more of ground engaging tools on the implement 10 have tripped.

In several embodiments, the controller 106 may also be configured to determine when one or more ground engaging tools of the implement 10 have become damaged. More specifically, the ground engaging tools (e.g., the shanks 54) may be become damaged due to contact with rocks or other field impediments. For example, in certain instances, the contact between a ground engaging tool and a rock/impediment may be severe enough and/or the rock/impediment may be large enough that the tripping is unable to prevent damage to the tool. When a ground engaging tool becomes damaged, the implement frame 28 experiences accelerations or vibrations that are generally greater than the accelerations/vibrations experienced by the frame 28 when the tool trips. As such, in one embodiment, the controller 106 may be configured to compare the values associated with the monitored motion of the frame 28 to first and second predetermined motion values, with the second predetermined motion value being greater than the first predetermined motion value. When the value(s) of the monitored frame motion exceeds the first predetermined motion value and falls below the second predetermined motion value, the controller 106 may be configured to determine that one or more of ground engaging tools on the implement 10 have tripped. Conversely, when the value(s) of the monitored frame motion exceeds the first and second predetermined motion values, the controller 106 may be configured to determine that one or more of ground engaging tools on the implement 10 have become damaged.

Figure 6:
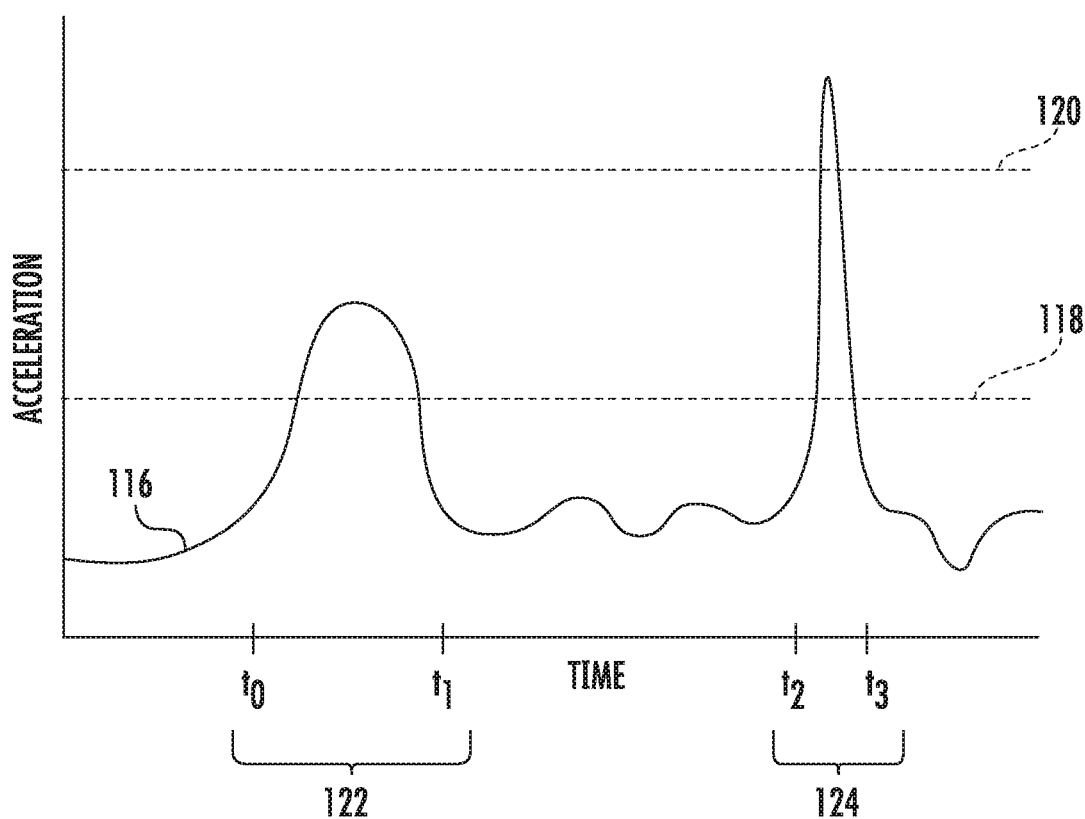
FIG. 6 illustrates a graphical view of an example dataset charting the motion of a frame of an agricultural implement relative to first and second predetermined motion values over time in accordance with aspects of the present subject matter.

For instance, FIG. 6 illustrates a graphical view of an example dataset charting the acceleration of one of the shanks 54 of the implement 10 (e.g., as indicated by solid line 116) relative a first predetermined acceleration value (e.g., as indicated by dashed line 118) and a second predetermined acceleration value (e.g., as indicated by dashed line 120) over time as monitored by the controller 106. As shown in FIG. 6, during various different time periods, the monitored acceleration of the shank 54 exceeds the first and/or second predetermined acceleration values 118, 120. More specifically, during a first time period 122 between time to and time $t_1$, the monitored acceleration of the shank 54 exceeds the first predetermined acceleration value 118 but falls below the second predetermined acceleration value 120. As such, during the first time period 122, the controller 106 may determine that the shank 54 has tripped. However, during a second time period 124 between time $t_2$ and time $t_3$, the monitored acceleration of the shank 54 exceeds the first and second predetermined acceleration values 118, 120. In this regard, during the second time period 124, the controller 106 may determine that the shank 54 has become damaged. Moreover, as shown in FIG. 6, the first time period 122 is greater than the second time 124. In general, the duration of time across which the shank 54 exceeds the first predetermined acceleration value 118 may generally be greater when the shank 54 trips than when the shank 54 becomes damaged.

It should be appreciated that the first and/or second predetermined acceleration values 118, 120 used by the controller 106 may generally be selected to prevent small implement frame accelerations/vibrations from triggering a determination that a ground engaging to has tripped or become damaged. Such small frame accelerations/vibrations may be caused by bumps in the field or other movement of frame 28 that is typically expected when performing an agricultural operation (e.g., a tillage operation).

Furthermore, it should be appreciated the controller 106 may be configured to determine when one or more ground engaging tools of the implement 10 have become damaged in any other suitable manner. For example, in one embodiment, the controller 106 may be configured to input the received motion data into one or more suitable machine-learned models and receive an output from the model(s) indicative of when the ground engaging tool(s) of the implement 10 have tripped. Example machine-learned models may include a neural network (e.g., a convolutional neural network, a feed-forward neural network, a recurrent neural network, and/or the like), a regression model (e.g., a logistic regression classifier), a support vector machine, a decision tree-based model (e.g., a random forest), a Bayes classifier, a K-nearest neighbor classifier, and/or the like.

Referring back to FIG. 5, the controller 106 may be configured to determine the location and/or identity of the particular ground engaging tool(s) has tripped. As described above, the controller 106 may be configured to monitor the motion of the implement frame 28 based on data received from the motion sensor(s) 102. Additionally, the controller 106 may be configured to process/analyze the received sensor data to determine or estimate the angular rate of change of the implement frame 28. The determined angular rate of change may, in turn, be the rate at which the frame 28 bends or twists relative to the surface of the field across which the implement 10 is being moved. For instance, the controller 106 may include a look-up table(s), suitable mathematical formula, and/or algorithms stored within its memory device(s) 110 that correlates the received sensor data to the angular rate of change of the orientation of the frame 28. In general, when a ground engaging tool mounted adjacent to the first or second side of the frame 28 trips, the frame 28 may experience a greater angular rate of change of its orientation than when a ground engaging tool mounted centrally on the frame 28 trips. As such, in several embodiments, the controller 106 may be configured to determine the general location of the ground engaging tool(s) that has tripped based on the determined angular rate of change. For example, in one instance, the controller 106 may determine that one or more shanks 54 adjacent to the aft end 34 and the second side 38 of the frame 28 have tripped based a particular determined angular rate of change. In another embodiment, the controller 106 may be configured to determine the specific ground engaging tool(s) that has tripped based on the determined angular rate of change. For example, in one instance, the controller 106 may determine that the shank 54 on the second rank of shanks 54 from the forward end 32 closest to the first side 36 has tripped based a particular determined angular rate of change.

Additionally, in several embodiments, the controller 106 may be configured to notify the operator of implement 10 that one or more ground engaging tools of the implement 10 have tripped. Specifically, the controller 106 may configured to transmit instructions to the user interface 114 (e.g., the communicative link 112). Such instructions may, in turn, instruct the user interface 114 to provide a notification to the operator of the implement 10 (e.g., by causing a visual or audible notification or indicator to be presented to the operator) that provides an indication that the one or more ground engaging tools of the implement 10 have tripped. In one embodiment, the notification/indicator may provide the location and/or identity of the particular ground engaging tool(s) that has tripped. In such instances, the operator may then choose to initiate any suitable corrective action he/she believes is necessary, such as adjusting the ground speed of the implement 10.

Furthermore, in one embodiment, the controller 106 may be configured to generate a field map illustrating the locations within the field at which a ground engaging tool of the implement 10 tripped. More specifically, as described above, the controller 106 may be configured to geo-locate the position of the implement 10 within the field and determine when a ground engaging tool on the implement 10 has tripped. As such, the controller 106 may associate each instance of ground engaging tool tripping with the position of the implement 10 (or, more specifically, the tool) within the field when the such tripping occurred. Thereafter, the controller 106 may be configured to generate a field map (e.g., a graphical field map) illustrating the locations within the field at which a ground engaging tool of the implement 10 tripped. For instance, the controller 106 may be configured to execute one or more algorithms stored within its memory 110 that generate the field map based on the data received from the motion sensor(s) 102 and the location sensor 104 (e.g., via the communicative link 112). In one embodiment, the controller 116 may be configured to transmit instructions to the user interface 114 (e.g., the communicative link 112) instructing the user interface 114 to display the field map (e.g., a graphical field map).

Moreover, in several embodiments, when it is determined that a ground engaging tool(s) of the implement 10 has tripped, the controller 106 may be configured to automatically adjust the ground speed at which the work vehicle 12 is towing the implement 10 across the field. Specifically, the controller 106 may be configured to transmit instructions to the engine 24 and/or the transmission 26 (e.g., via the communicative link 112). For example, the instructions may to instruct the engine 24 to vary its power output to increase or decrease the ground speed of the implement 10 in a manner that reduces further tripping of the ground engaging tools. Similarly, the instructions may also instruct the transmission 26 to upshift or downshift to change the ground speed of the implement 10 in a manner that reduces further tripping of the ground engaging tools. However, in alternative embodiments, the controller 106 may be configured to control the operation of any other suitable component of the implement 10 and/or the work vehicle 12 such that the ground speed of the implement 10 is adjusted.

Figure 7:
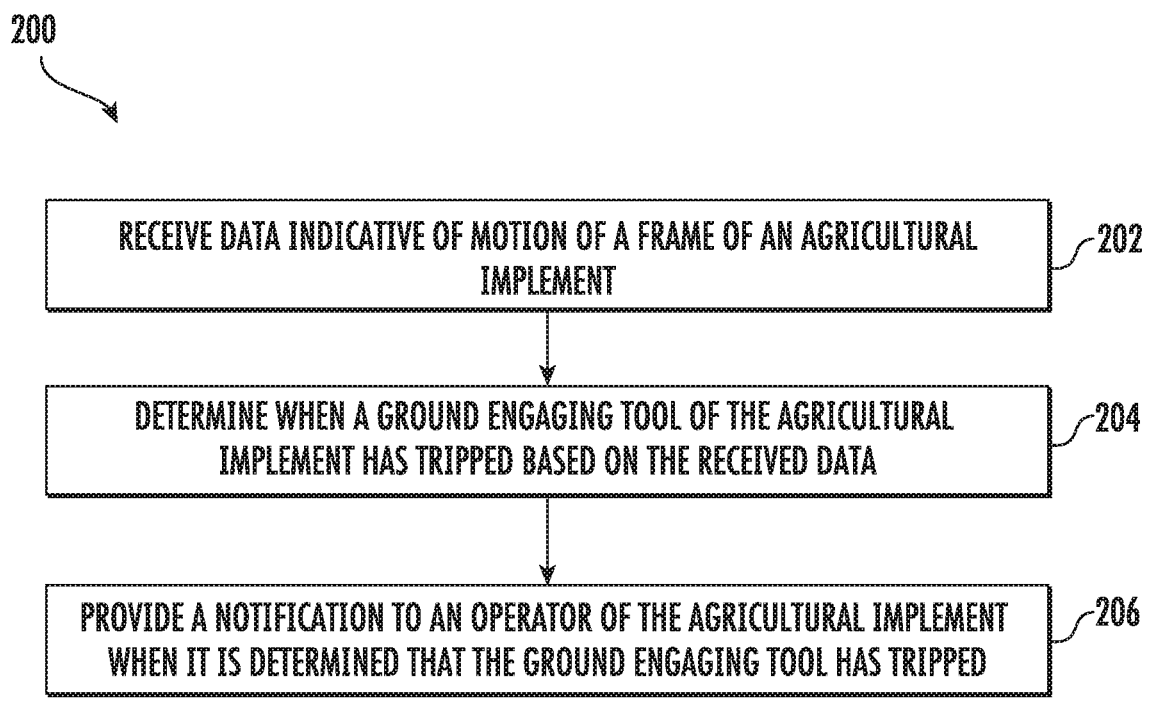
FIG. 7 illustrates a flow diagram of one embodiment of a method for detecting tripping of ground engaging tools on an agricultural implement in accordance with aspects of the present subject matter.

Referring now to FIG. 7, a flow diagram of one embodiment of a method 200 for detecting tripping of ground engaging tools on an agricultural implement is illustrated in accordance with aspects of the present subject matter. In general, the method 200 will be described herein with reference to the agricultural implement 10 and the system 100 described above with reference to FIGS. 1-6. However, it should be appreciated by those of ordinary skill in the art that the disclosed method 200 may generally be implemented with any agricultural implement having any suitable implement configuration and/or any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include receiving, with one or more computing devices, data indicative of motion of a frame of an agricultural implement. For instance, as described above, the controller 106 may be configured to receive data indicative of the motion of a frame 28 of an agricultural implement 10 from one or more motion sensors 102 installed on the frame 28.

Additionally, at (204), the method 200 may include determining, with the one or more computing devices, when a ground engaging tool of the agricultural implement has tripped based on the received data. For instance, as described above, the controller 106 may be configured to determine when a ground engaging tool (e.g., a shank 54) of the agricultural implement 10 has tripped based on the received data.

Moreover, as shown in FIG. 7, at (206), the method 200 may include providing, with the one or more computing devices, a notification to an operator of the agricultural implement when it is determined that the ground engaging tool has tripped. For instance, as described above, the controller 106 may be configured to provide a notification to an operator of the agricultural implement 10 when it is determined that the ground engaging tool has tripped.

It is to be understood that the steps of the method 200 are performed by the controller 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 106 described herein, such as the method 200, is implemented in software code or instructions which are tangibly stored on a tangible computer readable medium. The controller 106 loads the software code or instructions via a direct interface with the computer readable medium or via a wired and/or wireless network. Upon loading and executing such software code or instructions by the controller 106, the controller 106 may perform any of the functionality of the controller 106 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting tripping of ground engaging tools on an agricultural implement, the system comprising:
   an implement frame;
   a ground engaging tool coupled to the implement frame;
   a biasing element coupled between the implement frame and the ground engaging tool, the biasing element being configured to bias the ground engaging tool to a predetermined ground engaging tool position relative to the implement frame;
   a motion sensor installed on the implement frame, the motion sensor configured to capture data indicative of motion of the implement frame; and
   a controller communicatively coupled to the motion sensor, the controller configured to monitor the motion of the implement frame based on the data received from the motion sensor, the controller further configured to determine when the ground engaging tool has tripped based on the monitored motion.

2. The system of claim 1, wherein the controller is further configured to compare the monitored motion to a predetermined motion value and determine that the ground engaging tool has tripped when the monitored motion has exceeded the predetermined motion value.

3. The system of claim 2, wherein the predetermined motion value corresponds to a first predetermined motion value, the controller further configured to:
   compare the monitored motion to a second predetermined motion value, the second motion value being greater than the first motion value;
   determine that the ground engaging tool has tripped when the monitored motion exceeds the first predetermined motion value and falls below the second predetermined motion value; and
   determine that the ground engaging tool has become damaged when the monitored motion has exceeded the second predetermined motion value.

4. The system of claim 1, wherein the controller is further configured to provide a notification to an operator of the agricultural implement when it is determined that the ground engaging tool has tripped.

5. The system of claim 1, wherein the controller is further configured to initiate an adjustment of a ground speed of the agricultural implement when it is determined that the ground engaging tool has tripped.

6. The system of claim 1, wherein the controller is further configured to generate a field map illustrating one or more locations of the agricultural implement within the field when it was determined that the ground engaging tool tripped.

7. The system of claim 1, wherein the motion sensor comprises an inertial measurement unit.

8. The system of claim 1, wherein the ground engaging tool comprises a shank.

9. An agricultural implement, comprising:
   a frame;
   a plurality of ground engaging tools, each ground engaging tool being independently coupled to the frame;
   a plurality of biasing elements, each biasing element coupled between the frame and one of the plurality of ground engaging tools, each biasing element being configured to bias the corresponding ground engaging tool to a predetermined ground engaging tool position relative to the frame;
   a motion sensor installed on the frame, the motion sensor configured to capture data indicative of motion of the frame; and
   a controller communicatively coupled to the motion sensor, the controller configured to:
      monitor the motion of the frame based on the data received from the motion sensor;
      determine when a first ground engaging tool of the plurality of ground engaging tools has tripped or become damaged based on the monitored motion; and
      determine which ground engaging tool of the plurality of ground engaging tools corresponds to the first ground engaging tool based on the monitored motion.

10. The agricultural implement of claim 9, wherein the controller is further configured to:
    determine an angular rate of change of an orientation of the frame based on the monitored motion; and
    determine which ground engaging tool of the plurality of ground engaging tools corresponds to the first ground engaging tool based on the determined angular rate of change.

11. The agricultural implement of claim 9, wherein the frame comprises a first section and a second section and the motion sensor comprises a first motion sensor installed on the first section of the frame and further comprising a second motion sensor installed on the second section of the frame.

12. The agricultural implement of claim 9, wherein the controller is further configured to compare the monitored motion to a predetermined motion value and determine that the first ground engaging tool has tripped or become damaged when the monitored motion has exceeded the predetermined motion value.

13. The agricultural implement of claim 9, wherein the controller is further configured to:
    compare the monitored motion to first and second predetermined motion values, the second motion value being greater than the first motion value;
    determine that the first ground engaging tool has tripped when the monitored motion exceeds the first predetermined motion value and falls below the second predetermined motion value; and determine that the first ground engaging tool has become damaged when the monitored motion has exceeded the second predetermined motion value.

14. The agricultural implement of claim 9, wherein the controller is further configured to initiate an adjustment of a ground speed of the agricultural implement when it is determined that the ground engaging tool has tripped or become damaged.

15. A method for detecting tripping of ground engaging tools on an agricultural implement, the agricultural implement comprising a frame and a ground engaging tool coupled to the frame, the method comprising:
- receiving, with one or more computing devices, data indicative of motion of the frame;
- determining, with the one or more computing devices, when the ground engaging tool has tripped based on the received data; and
- providing, with the one or more computing devices, a notification to an operator of the agricultural implement when it is determined that the ground engaging tool has tripped.

16. The method of claim 15, wherein determining when the ground engaging tool has tripped further comprises:
- comparing, with the one or more computing devices, the monitored motion to a predetermined motion value; and
- determining, with the one or more computing devices, that the ground engaging tool has tripped when the monitored motion has exceeded the predetermined motion value.

17. The method of claim 16, wherein the predetermined motion value corresponds to a first predetermined motion value and determining when the ground engaging tool has tripped further comprises:
- comparing, with the one or more computing devices, the monitored motion to a second predetermined motion value, the second motion value being greater than the first motion value;
- determining, with the one or more computing devices, that the ground engaging tool has tripped when the monitored motion exceeds the first predetermined motion value and falls below the second predetermined motion value; and
- determining, with the one or more computing devices, that the ground engaging tool has become damaged when the monitored motion has exceeded the second predetermined motion value.

18. The method of claim 15, further comprising:
- initiating, with the one or more computing devices, an adjustment of a ground speed of the agricultural implement when it is determined that the ground engaging tool has tripped.

19. The method of claim 15, further comprising:
- generating, with the one or more computing devices, a field map illustrating one or more locations of the agricultural implement within the field when it was determined that the ground engaging tool tripped.

* * * * *